July 7, 1970     T. REIFENHÄUSER     3,519,048
CUTTER ASSEMBLY FOR USE IN APPARATUS FOR
COMMINUTING MEAT OR THE LIKE
Filed Aug. 20, 1968     2 Sheets-Sheet 1
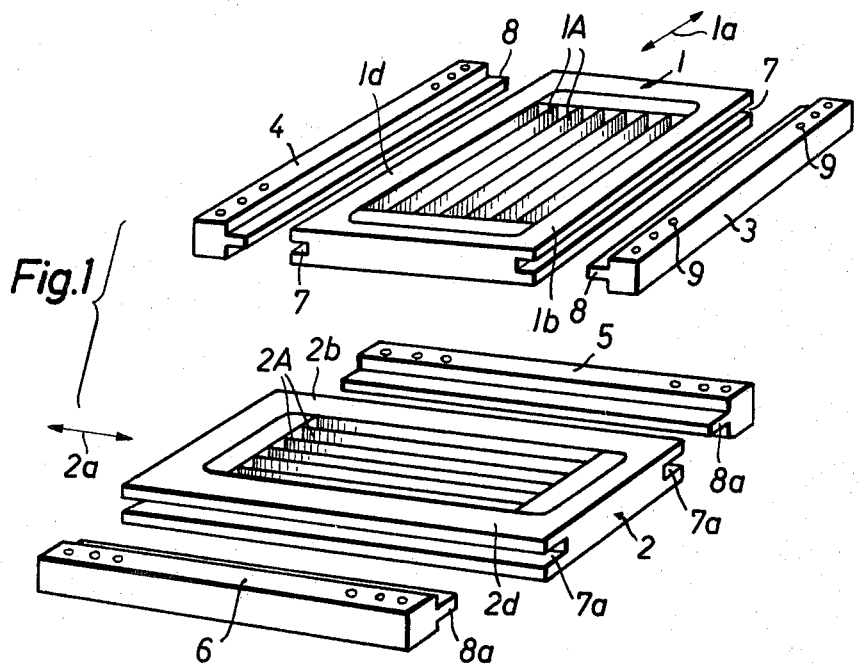
INVENTOR
Toni Reifenhäuser
BY
Michael J. Striker
his ATTORNEY

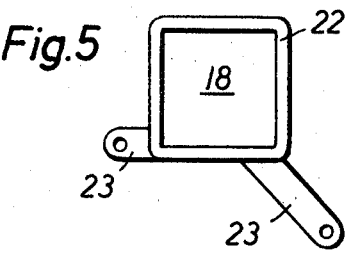
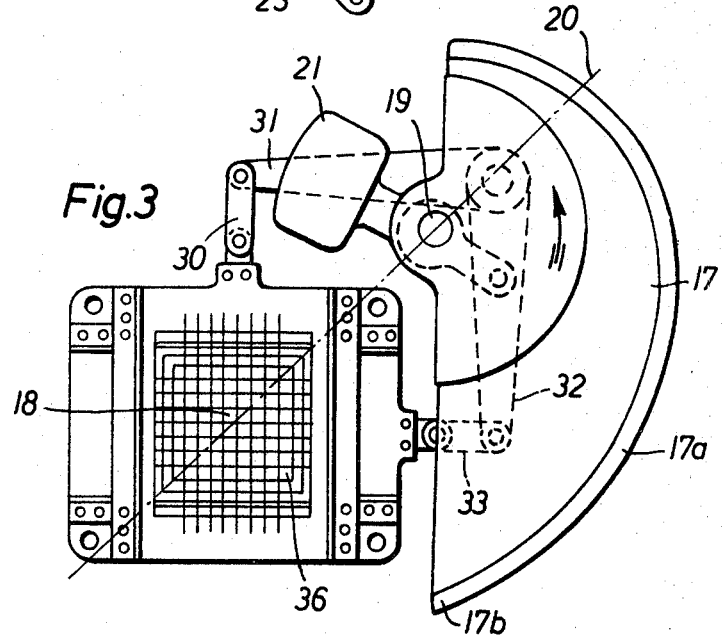
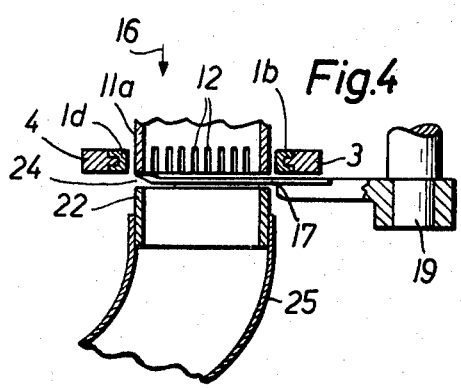

United States Patent Office 3,519,048
Patented July 7, 1970

3,519,048
CUTTER ASSEMBLY FOR USE IN APPARATUS
FOR COMMINUTING MEAT OR THE LIKE
Toni Reifenhäuser, Burglahr, Westerwald, Germany
Filed Aug. 20, 1968, Ser. No. 754,077
Int. Cl. A23n 15/00; B26d 3/26, 5/18
U.S. Cl. 146—78                                    17 Claims

ABSTRACT OF THE DISCLOSURE

A cutter assembly for use in apparatus for comminuting meat or other foodstuffs is provided with two rectangular frames located in parallel planes and reciprocable at right angles to each other. The frames are guided by elongated dry bearings and carry sets of knives which are parallel to the directions of reciprocatory movement of the respective frames. A tubular stripper block extends into the frames and is slotted to permit passage of knives. A rotary cutoff knife with a convex cutting edge rotates in a plane adjacent to one end of the stripper block and co-operates with a tubular counterknife which is connected with a conduit. The cutoff knife rotates about an axis which is remote from the frames and is parallel to the direction of material feed. The material is fed into the other end of the stripper block and is slitted lengthwise and crosswise by the knives of the two frames so that it forms a bunch of strands which are fed lengthwise across the plane of the revolving cutoff knife to be comminuted into blocks, cubes or like particles.

Background of the invention

The present invention relates to a cutter assembly which is intended for use in comminuting of foodstuffs, particularly raw and processed meat including sausages, bacon and like materials. More particularly, the invention relates to improvements in a cutter assembly which is utilized to comminute foodstuffs into blocks, cubes and similar particles.

Cutter assemblies of the type to which the present invention pertains normally comprise two frames which are reciprocable in parallel planes at right angles to each other and carry sets of parallel knives which sever a batch of material advancing against the knives under the action of a plunger which expels material from the magazine of a comminuting apparatus. The knives of the two frames convert the batch into a column of strands of rectangular cross section and such strands are thereupon severed by a cutoff knife which rotates in a plane adjacent to the second frame as considered in the direction of feed. Thus, the knives of the first frame shape two opposed sides, the knives of the second frame shape the other two opposed sides and the cutoff knife shapes the top and bottom of each block-shaped particle. A stripper block is normally provided to guide the material during travel through the frames, and such block is provided with two sets of slits for the reciprocating knives in the frames. The block is a short thick-walled tube of rectangular outline which is open at both ends and is bolted to the housing of the comminuting apparatus. The slits are just wide enough to permit reciprocatory movements of knives but they prevent escape of material from the interior of the block. The stripper block of a conventional cutter assembly performs the additional function of guiding the frames for reciprocatory movement with their knives. To this end, the block is provided with extensions which have slots for portions of frames. The cutoff knife rotates in a plane which is closely adjacent to one end of the stripper block.

A serious drawback of the just described conventional cutter assembly is that the bearings of the stripper block for the reciprocable frames are subjected to excessive wear, mainly because the area of contact between such bearings and the frames is rather small. Therefore, the block must be replaced at frequent intervals or the frames are free to reciprocate with excessive play which affects the quality of the product. Accurate guidance of frames is of utmost importance because, when the material to be comminuted is meat which contains stringy portions, the knives are unable to convert such stringy portions into neat cubes or blocks if the frames are free to wobble with reference to the stripper block and/or with reference to the revolving cutoff knife. The blocks then form a continuous line of interconnected fragments which resembles the pearls of a necklace.

Another drawback of conventional cutter assemblies is that the rotational speed of the cutoff knife cannot exceed a predetermined relatively low maximum speed which, of course, limits the output of the comminuting apparatus.

Summary of the invention

It is an object of my invention to provide a novel and improved cutter assembly wherein the movable parts are subjected to lesser wear than in conventional cutter assemblies and whose output exceeds considerably the output of known cutter assemblies.

Another object of the invention is to provide novel and improved bearings for reciprocating frames of the cutter assembly.

A further object of the invention is to provide a novel and improved cutoff knife and a novel counterknife for use in a cutter assembly of the above outlined character.

An additional object of the invention is to provide the cutter assembly with a simple stripper block and with a novel support for the bearings which guide the frames.

An ancillary object of the invention is to provide a cutter assembly which can be readily taken apart and reassembled with little loss in time, by resorting to simple tools, at the locale of use, and by semiskilled or unskilled persons.

A concomitant object of the invention is to provide a cutter assembly which can be utilized in presently known comminuting apparatus for meat and other types of foodstuffs.

The improved cutter assembly comprises first and second frames reciprocable in adjacent parallel planes substantially at right angles to each other and each supporting and confining a plurality of cross-cutting knives parallel to the directions of movement of the respective frames, elongated bearings arranged to guide the frames; a cutoff knife mounted for rotation about an axis which is remote and laterally offset from the frames, the cutoff knife being located in a plane which is adjacent to one of the frames and having a convex cutting edge, and a counterknife adjacent to the plane of and co-operating with the cutoff knife to sever the material which is fed first through the other frame, thereupon through the one frame, and finally across the plane of the cutoff knife. The distance between the axis of the counterknife and the path for material which is being forced to move through the frames preferably at least equals the maximum transverse dimension of the outlet in a feed of the comminuting apparatus which supplies material into the range of knives in the other frame.

The novel features which are considered as characteristic of the invention are set forth in particular in the appended claims. The improved cutter assembly itself, however, both as to its construction and its mode of operation, together with additional features and advantages thereof, will be best understood upon perusal of the following detailed description of a specific embodiment with reference to the accompanying drawing.

Brief description of the drawing

FIG. 1 is an exploded perspective view of the frames with cross-cutting knives and their bearings;

FIG. 2 is an exploded perspective view of the stripping block and of the support for the bearings;

FIG. 3 is a plan view of the cutter assembly;

FIG. 4 is a fragmeneary sectional view of the line 20 of FIG. 3; and

FIG. 5 is a plan view of the counterknife.

Description of the preferred embodiment

FIG. 1 illustrates two rectangular frames 1 and 2 which are located in two adjacent parallel planes and respectively support and confine sets of cross-cutting knives 1A, 2A. The knives of each set are disposed in parallel planes and extend in parallelism with the directions of reciprocatory movement of the respective frame. The frame 1 is reciprocable in directions indicated by a double-headed arrow 1a and the frame 2 reciprocates in directions indicated by arrow 2a. These frames respectively comprise sidewalls 1b, 1d and 2b, 2d which are parallel to the respective knives 1A, 2A and are provided with elongated grooves 7, 7a for tongues 8, 8a of two pairs of dry bearings 3, 4 and 5, 6. The provision of tongues 8, 8a and grooves 7, 7a enlarges considerably the area of contact between the bearings and the respective side walls so that the frames are guided with great accuracy when the cutter assembly is in use. Furthermore, the wear on the abutting surfaces of side walls and corresponding bearings is negligible.

Each bearing has three bores 9 provided close to each of its longitudinal ends, and such bores can receive bolts, screws or analogous fasteners by means of which the bearings are separably secured to a plate-like support 10 shown in FIG. 2. This support has a central aperture 15 of rectangular outline which can receive a matching portion or extension 11a of a tubular stripper block 11 shown in FIG. 2. The extension 11a is provided with shallower slits 12 for the knives 2A and with deeper slits 13 for the knives 1A. The arrow 16 indicates the direction in which the material is being fed into the stripper block 11 to be severed by the knives 1A of the frame 1, thereupon by the knives 2A of the frame 2 and to move across the plane of a rotary cutoff knife 17 which is shown in FIG. 3. FIG. 2 further illustrates holes 14 for bolts, screws or like fasteners (not shown) which connect the support 10 with a tubular element 18 forming part of a feed which supplies material into the stripper block 11. The arrangement is such that the flange of the stripper block 11 is automatically located and clamped between the support 10 and the element 18 when the latter is properly secured to the support. The element 18 is further connected to or forms part of the housing in a comminuting apparatus which may be constructed in a manner as disclosed in my co-pending application Ser. No. 753,509, filed Aug. 19, 1968 and entitled "Apparatus for Comminuting Foodstuffs." The element 18 has a rectangular central opening or outlet which registers with the opening of the extension 11a of the stripper block 11. This element 18 may be disposed in a vertical plane or in a horizontal plane. If it is located in a horizontal plane, the material is fed downwardly, first through the outlet of the element 18, then through the block 11 whose extension 11a is accommodated in the aperature 15 of the support 10, and thereupon across the plane of the cutoff knife 17.

FIG. 3 shows that the cutoff knife 17 is rotatable about the axis of a drive shaft 19 which is laterally spaced from the frames 1, 2 and is parallel to the axis of the element 18. The knife 17 has a convex cutting edge 17a. The distance between the axis of the shaft 19 and the nearest corner of the element 18 at least equals but preferably exceeds the maximum transverse dimension (the length of the diagonal) of the outlet in the element 18. In the illustrated embodiment, the axis of the shaft 19 is located on a line 20 located in a plane which extends diagonally across the element 18. The knife 17 rotates in a counterclockwise direction as indicated by the arrow and is balanced by a counterweight 21. The numerals 30–33 denote the components of a link train which reciprocates the frames 1, 2 with reference to their bearings 3–4 and 5–6 in response to rotation of the drive shaft 19.

The cutter assembly further comprises a tubular counterknife 22 which is adjacent to the plane of the knife 17 and defines with the extension 11a a very narrow gap 24 for the knife 17. This counterknife 22 is provided with lugs 23 by means of which it can be rigidly affixed to the housing of the comminuting apparatus. A flexible conduit 25 is attached to the counterknife 22 to convey comminuted particulate material to storage or to a further processing station, not shown. The purpose of the counterknife 22 is to prevent material which has been severed by knives 1A and 2A to yield sideways in response to engagement with the cutting edge 17a of the revolving cutoff knife 17. Thus, the counterknife 22 insures the formation of uniform cubes or blocks. In its elementary form, the counterknife could resemble an L-shaped member and would flank merely two sides of the path for the material which moves across the plane of the knife 17, namely, that corner of the path for material which is last to be traversed by the cutting edge 17a. This corner is indicated in FIG. 3 at 36. However, I prefer at this time to employ a tubular counterknife because such counterknife can be readily attached to the conduit 25 and also because it can confine the path of advancing material at all four sides in registry with the element 18 of the feed. It is clear that the lugs 23 can be replaced by other suitable means for securing the counterknife 22 to the comminuting apparatus.

Due to the fact that the shaft 19 is remote from the path of conveyed material. I establish advantageous lever arm conditions for the cutoff knife 17. Additional improvements in the severing action of the knife 17 are due to configuration of its cutting edge 17a. This cutting edge penetrates into advancing material in a direction toward the diagonal line 20 and severs the material by drawing across such line. In other words, the action of the knife 17 is analogous to that of a knife which is operated by hand and not like, say, the blade of a pair of scissors. The cutting edge 17a severs material while the knife 17 rotates through approximately 180 degrees. In conventional cutter assemblies, the cutoff knife severs material while rotating through a small fraction of a full revolution, normally not more than 60 degrees. The cutting speed of the edge 17a increases in a direction away from the shaft 19, i.e., along the line 20 of FIG. 3.

If desired, the conduit 25 can be replaced by a rigid pipe or by another material receiving part. The frames 1, 2, the stripper block 11 and the bearings 3–6 preferably consist of austenitic grey iron with graphite in lamellar or spherical form.

An important advantage of the just described cutter assembly is that its parts can be readily taken apart and reassembled with little loss in time and by resorting to readily available simple tools. Moreover, the wear on the frames 1, 2 is very small and such wear, if any, is distributed along large surfaces of contact between the sidewalls 1b–1d and 2b–2d on the one hand and the complementary surfaces of bearings 3–4, 5–6 on the other hand. In order to take the cutter assembly apart, the operator merely removes a few fasteners from the bores 9 and 14 whereby the frames 1 and 2 can be removed for inspection, cleaning and/or replacement. Such operation can be carried out by the user of the comminuting apparatus, i.e., the sharpening, cleaning, inspecting and replacing operations can be carried out at the locale in use, not in the plant.

Due to the fact that the frames 1, 2 are slidable between elongated dry bearings which engage the side walls of such frames substantially along their full length, the frames can be guided with a high degree of accuracy and the useful life of such dry bearings exceeds many times the useful life of presently known bearings on the stripper block. Accurate guidance of frames is important because the knives of the cutoff assembly must co-operate with a high degree of precision and the misalignment of knives should not exceed a very small fraction of a millimeter.

The presence of the counterknife 22 is particularly beneficial when the apparatus which employs the improved cutter assembly is used for dicing of raw meat. Due to the fact that the shaft 19 for the cutoff knife 17 is remote from the element 18, the curvature of the cutting edge 17a need not be very pronounced so that the knife 17 is "pulled" across the mass of material which issues from the extension 11a of the block 11. This insures gentler treatment of material and the counterknife further insures that the particles of material which are severed by the cutting edge 17a are not simply flung laterally on movement beyond the plane of the knife 17. This reduces the likelihood of squashing and larding.

An additional important advantage of the novel mounting of the knife 17 is that the rotational speed in the region of the tip 17b of the cutting edge 17a is very high whereby such rapidly moving part of the cutting edge invariably insures satisfactory severing action in that corner of the path for material which is remotest from the shaft 19 and in which relatively tough fragments of material are most likely to accumulate under the action of the knife 17 when the cutter assembly is in use.

What is claimed as new and desired to be protected by Letters Patent is set forth in the appended claims.

I claim:

1. A cutter assembly, particularly for use in apparatus for comminuting meat and like materials, comprising first and second frames reciprocable in adjacent parallel planes substantially at right angles to each other and each supporting and confining a plurality of cross-cutting knives parallel to the directions of movement of the respective frames; elongated bearings arranged to guide said frames; a cutoff knife mounted for rotation about an axis which is remote and laterally offset from said frames, said cutoff knife being located in a plane which is closely adjacent to one of said frames and having a convex cutting edge; and a counterknife adjacent to said plane and co-operating with said cutoff knife to sever material which is fed first through the other of said frames, thereupon through said one frame and finally across said plane.

2. A cutter assembly as defined in claim 1, further comprising a feed having an outlet for supplying material into said other frame, the distance between said axis and said outlet being at least equal to the maximum transverse dimension of the outlet.

3. A cutter assembly as defined in claim 1, wherein each of said frames comprises a pair of side walls parallel to the directions of movement of the respective frame and wherein said bearings extend along and guide such side walls of said frames.

4. A cutter assembly as defined in claim 3, wherein said side walls are provided with elongated grooves and said bearings comprise tongues extending into the respective grooves.

5. A cutter assembly as defined in claim 3, further comprising an apertured support for said bearings.

6. A cutter assembly as defined in claim 5, further comprising a tubular stripper block received in said apertured support, said block having slits for said cross-cutting knives.

7. A cutter assembly as defined in claim 6, further comprising a feed adjacent to said support and means securing said support to said feed, said stripper block being held against movement relative to said support when the latter is fastened to said feed.

8. A cutter assembly as defined in claim 6, wherein said frames, said bearings and said stripper block consist of austenitic grey iron with spherical or lamellar graphite.

9. A cutter assembly as defined in claim 1, wherein said counterknife comprises portions flanking at least two sides of the path wherein the material is fed across the plane of said cutoff knife and wherein said portions of the counterknife flank that portion of said path which is the last to be traversed by said cutoff knife while the latter moves across said path.

10. A cutter assembly as defined in claim 6, further comprising a feed for supplying material into that end of said stripper block which is remote from said counterknife and wherein said feed has a rectangular outlet, said counterknife being of rectangular outline and registering with said outlet.

11. A cutter assembly as defined in claim 10, further comprising tubular material receiving means secured to said counterknife to receive comminuted particulate material.

12. A cutter assembly as defined in claim 6, further comprising a feed for supplying material into said stripper block, said feed having a rectangular outlet and said axis being located in a plane extending substantially diagonally across said outlet.

13. A cutter assembly as defined in claim 12, wherein said cutting edge is arranged to penetrate into the material in a direction toward said plane and to execute a drawing action across said plane.

14. A cutter assembly as defined in claim 12, wherein said cutting edge is arranged to sever the material at a speed which increases in a direction away from said axis.

15. A cutter assembly as defined in claim 1, wherein the configuration of said cutting edge is such that it severs material during substantially one-half of each revolution of said cutoff knife.

16. A cutter assembly as defined in claim 1, further comprising a counterweight connected to and arranged to balance said cutoff knife.

17. A cutter assembly as defined in claim 6, wherein said counterknife and said stripper block define between themselves a gap which is located in said plane and is just wide enough to permit passage of said cutoff knife.

References Cited

UNITED STATES PATENTS 264,114   9/1882   Streicher et al. _____ 146—78

FOREIGN PATENTS 7,198   1/1905   Denmark.

W. GRAYDON ABERCROMBIE, Primary Examiner